United States Patent
Böhm et al.

(10) Patent No.: US 8,421,385 B2
(45) Date of Patent: Apr. 16, 2013

(54) METHOD FOR BRAKING AN ELECTROMOTOR AND ELECTRICAL DRIVE

(75) Inventors: Jürgen Böhm, Oberneisen (DE); Peter Stauder, Mainz (DE); Marc Menzel, Marburg (DE); Tom Kaufmann, Winterbach (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 10/583,620

(22) PCT Filed: Dec. 22, 2004

(86) PCT No.: PCT/EP2004/053664
§ 371 (c)(1),
(2), (4) Date: May 15, 2007

(87) PCT Pub. No.: WO2005/061304
PCT Pub. Date: Jul. 7, 2005

(65) Prior Publication Data
US 2007/0273314 A1 Nov. 29, 2007

(30) Foreign Application Priority Data
Dec. 24, 2003 (DE) .................................. 103 61 242

(51) Int. Cl.
*H02P 3/00* (2006.01)
(52) U.S. Cl.
USPC ............................. 318/375; 318/363; 318/447
(58) Field of Classification Search ................. 318/375, 318/363, 447, 466, 469
See application file for complete search history.

(56) References Cited

U.S. PATENT DOCUMENTS

| 4,354,147 A | 10/1982 | Klaussner |
| 2005/0057200 A1* | 3/2005 | Akiyama ........................ 318/66 |

FOREIGN PATENT DOCUMENTS

| DE | 3526374 | 2/1986 |
| DE | 19811992 | 9/1999 |
| EP | 0920119 | 6/1999 |
| EP | 1318596 | 6/2003 |

* cited by examiner

*Primary Examiner* — Karen Masih

(57) ABSTRACT

Disclosed is a method for braking or stopping an electromotor which can be operated with direct current, such as a brushless direct current motor. If there is an error in the electromotor or in the electronic or mechanical units connected to the electromotor, the presence of definite error states is verified, and the electromotor is braked, by carrying out, taking into consideration a maximum loading capacity of an electronic control unit which is connected to the electromotor, at least temporarily, a control of the electromotor which is adapted to the detected, definite error state.

4 Claims, 2 Drawing Sheets

US 8,421,385 B2

METHOD FOR BRAKING AN ELECTROMOTOR AND ELECTRICAL DRIVE

BACKGROUND OF THE INVENTION

The invention relates to a method for braking or stopping an electromotor which can be driven by a direct current, particularly a brushless direct current motor, in the case of a defect of the electromotor or the units connected to the latter.

The invention also relates to an electrical drive for a superposition steering for a vehicle or for an electromechanical brake (EMB), which presents an electromotor which can be driven by a direct current motor, particularly a brushless direct current motor, an electronic control and regulation unit, and a power electronic unit for controlling the electromotor.

The term "superposition steering" denotes all the steering types where a steering angle which has been set by the driver or a set steering moment can receive as a superposition an additional angle or an additional moment, particularly to increase the steering stability at the time of the steering angle superposition and to provide driver assistance, for example, for lane steering, at the time of the moment superposition.

The term "electromechanical brake" denotes all the brake installations in which a brake force is generated with an electromechanical actuator, particularly an electromotor with a connected gearing. The brake force is transmitted via a brake friction coating to a brake disk or a brake drum, to decelerate the vehicle.

The invention also relates to a computer program.

A controlled and reliable braking or stopping of an electromotor is required in many application cases. Particularly for applications that are critical for safety, where the electromotor represents an actuator for a safety-critical function, such as, for example, in the gearing of a steering system for a vehicle or for an electromechanical brake (EMB), a reliable error acquisition strategy is absolutely necessary.

Brushless electromotors or electronically commutated electromotors therefore are becoming increasingly important. They replace particularly electromotors with brushes in such industrial applications as actuators. The advantages compared to motors with brushes are primarily the lower maintenance efforts resulting from the absence of any commutator brushes that are subject to wear and the fact that the degree of effectiveness is in principle higher due to the absence of commutator losses caused by the brush transition resistances. In addition, in connection with "intelligent" electronic commutation devices, some functions can be implemented which are not possible with motors that have brushes, or which can be achieved only by considerable additional mechanical effort.

Because, in the case of brushless electromotors, the functions of mechanical, inherently substantially safer and more reliable components, in this case the commutator brushes of a commutator motor, are replaced by mechatronic components, appropriate measures must be used to reliably ensure the absence of breakdowns. Due to the relatively high complexity of the commutation electronics of brushless motors, the number of possible errors is relatively high.

In addition, in many safety-critical systems, the motor rpm or the motor position is measured with an rpm sensor or a position sensor, and used for the regulation of the system. In that case, a definite error processing strategy is required in case there is an error in the determination of the motor rpm or motor position.

An objective of the invention is to provide a method which allows the reliable braking or stopping of brushless direct current motors, in particular.

This problem is solved by a method and a device. The method is a method for braking an electromotor which can be driven by a direct current, such as a brushless direct current motor, in the case of the presence of an error of the electromotor or units connected therewith, characterized in that the presence of definite error states is verified, and the electromotor is braked, by carrying out, at least temporarily, a control of the electromotor which is adapted to the detected, definite error state, taking into account a maximum loading capacity of one of the electronic control units connected to the electromotor. The device is an electrical drive for a superposition steering for a motor vehicle or for an electromechanical brake (EMB), which presents an electromotor which can be operated with a direct current, such as a brushless direct current motor, an electronic control unit and a power electronics unit for controlling the electromotor, characterized in that the electronic control and unit presents a detector, for detecting an error of the electromotor and/or an electronic unit connected to the latter, and the electronic control unit presents a braking device, for braking the electromotor, when the detector detects an error, in which the braking device causes the power electronics, at least temporarily in at least one motor phase, to produce a short circuit as a function of the recognized, definite error state, taking into account a maximum loading capacity of the power electronics.

SUMMARY OF THE INVENTION

The problem is solved by the fact that the method provides for a verification of the presence of definite error states, and for braking the electromotor, by carrying out a control of the electromotor, which is adapted at least in part to the detected, definite error state, taking into account the maximum loading capacity of an electronic control device which is connected to the electromotor.

The invention provides particularly the advantage that the braking process occurs as rapidly as possible, without overloading the electronic control unit, that is, the power electronics.

The method is used preferably in case of an error to brake electronically commutated, three-phase, permanently excited synchronous motors SM. The latter consist of the main components stator (stator), with a stator winding and rotor (rotor), and they present a regulation unit, preferably a PWM regulation, which determines the application of the correct current feed to the stator winding and carries out an adjustment via the power friction device.

According to the invention, the method ensures that a verification is carried out to observe whether a control current or control currents applied to the electromotor, preferably an electronically commutated direct current motor with a PWM regulation, is/are determinable, that, in case the control current or the control currents was (were) determined, the electromotor is braked, by producing, at least temporarily in at least one motor phase, a short circuit, particularly by the application of a current indicator via a PWM in the case of an electronically commutated direct current motor, and, in the case where a control current or control currents is not determinable, the electromotor is braked, by producing, at least temporarily in at least one motor phase, a short circuit, as a function of the rpm number or under time control.

According to the invention, the method ensures that a verification is carried out to determine whether a current rpm of the electromotor, particularly of an electronically commutated direct current motor with a PWM regulation, is determinable, that, in case the current rpm was determined, the electromotor is braked, by producing, at least temporarily in at least one motor phase, a short circuit, as a function of the rpm of the current rpm, particularly by the application of a voltage indicator via a PWM in an electronically commutated direct current motor, and, in case the current rpm of the electromotor is not determinable, the electromotor is braked, by producing, at least temporarily in at least one motor phase, a short circuit under time control.

According to the invention, the method ensures that a verification is carried out to determine whether an rpm of the electromotor, preferably of an electronically commutated direct current motor with a PWM regulation, is determinable at the time when the error occurred, that, in case the rpm was determined at the time when the error occurred, the electromotor is braked, by producing, at least temporarily in at least one motor phase, a short circuit, under time control, as a function of the rpm at the time when the error occurred, particularly by the application of a voltage indicator via PWM in the case of an electronically commutated direct current motor, and, in case the rpm is not determinable at the time when the error occurred, the electromotor is braked, by producing, at least temporarily in at least one motor phase, a short circuit, under time control, as a function of a minimum rpm of the electromotor, particularly by the application of a voltage indicator via a PWM in the case of an electronically commutated direct current motor.

The problem is solved by an electrical drive for superposition steering for a motor vehicle, which is characterized in that the electronic control and regulation unit presents a detection means, to detect an error of the electromotor and/or an electronic unit connected to the latter, and in that the electronic control and regulation unit presents braking or stopping means, to brake the electromotor, if the detection means detected an error, by the fact that the braking and stopping means cause the power electronics, at least temporarily in at least one motor phase, to produce a short circuit as a function of the detected, definite error state, taking into account a maximum loading capacity of the output electronics.

The invention particularly has the advantage that the braking occurs as rapidly as possible, without overloading the electronic control unit, that is, the power electronics.

According to the invention, the electrical drive ensures that the electromotor is an electronically commutated direct current motor and the electronic control and regulation unit presents a PWM regulation for the direct current motor, that the detection means presents a control current determination to determine the control current or the control currents applied to the direct current motor, that, in case the detection means detected an error and if a control current or control currents is/are determinable, the direct current motor is braked, by the fact that the stopping and control means cause the power electronics, at least temporarily and in at least one motor phase, to produce a short circuit, which is current-regulated as a function of the determined control current or control currents, particularly by the application of a current indicator via the PWM, and, in case the detection means detected an error and no control current or control currents is/are determinable, the electromotor is braked, by producing, at least temporarily in at least one motor phase, a short circuit which is rpm-dependent as a function of the direct current motor rpm or under time control.

Advantageously, the rpm and the precise angular position or phase position of the rotor is determined by an (absolute) position measurement. The absolute measurement system is applied, for example, to a shaft, on which the rotor sits. It delivers at all times the exact angular position of the rotor to the stator. As absolute measurement system one can use, for example, so-called resolvers, such as induction measuring devices or rotating transformers, or Hall sensors.

If the rpm and the phase position are known, then the phase currents can also be estimated on the basis of the strand tensions, taking into account the induced, rpm-proportional counter stresses, and a regulation can take place to slow the electromotor by braking on the basis of the estimated phase currents.

According to the invention, the electrical drive system is such that the electromotor is an electronically commutated direct current motor and the electronic control and regulation unit presents a PWM regulation for the direct current motor, the detection means has a motor rpm detector for detecting the current rpm of the direct current motor, the direct current motor is braked by the fact that the stopping and controlling means cause the power electronics, at least temporarily and in at least one motor phase, to produce an rpm-dependent short circuit as a function of the current rpm, particularly by the application of a voltage indicator via the PWM, and, in case the detection means detected an error and no current motor rpm is determinable, the electromotor is braked by producing, at least temporarily in at least one motor phase, a short circuit, under time control.

According to the invention, the electrical drive is such that the electromotor is an electronically commutated direct current motor and the electronic control and regulation units present a PWM regulation for the direct current motor, the detection means has a motor rpm detector for detecting the rpm of the direct current motor at the time when the error occurred, the direct current motor is braked by the fact that the stopping and control means cause the power electronics to produce, at least temporarily in at least one motor phase, a short circuit, under time control as a function of the rpm at the time when the error occurred, particularly by the application of a voltage indicator via the PWM, and, in case the detection means detected an error and no motor rpm can be determined at the time when the error occurred, the electromotor is braked, by producing, at least temporarily in at least one motor phase, a short circuit, under time control, as a function of the maximum rpm of the direct current motor.

According to the invention, the electrical drive is such that, in addition, an electronic control and regulation auxiliary unit is provided, which presents braking and stopping auxiliary means, for braking the electromotor, when the detection means detected an error, which is present in the electronic control and regulation unit, and which does not guarantee the control of the power electronics by the stopping and control means.

The problem was also solved by a computer program, which is characterized in that it presents program steps to carry out the method according to the invention.

According to the invention, the method and the device are used particularly for brushless electromotors in the motor vehicle sector for steering systems, such as, steer-by-wire systems or electrical steering assistance systems, such as superposition steering systems, or for brake systems, such as brake-by-wire systems.

By using the method according to the invention, it is possible to achieve a braking process which avoids an undesirable movement of the actuator of the steering system or the brake-by-wire system.

Furthermore, an "electronic" clamping of the rotor of the motor can be carried out, where the electromotor is fixed in a certain position.

Accordingly, a mechanical latching can also be carried out by a latching unit. A reason for the advantage of the method and of the drive is that the fixing of the motor—compared to mechanical latching—can occur very rapidly, resulting in the reliable avoidance of an undesired actuator movement.

For safety-critical steer-by-wire systems or brake-by-wire systems, the electromotor and its control, which drive the actuator, are preferably designed with redundancy. After an error has been detected, the functions of the electromotor which presents the error can then also be ensured by the redundant systems.

BRIEF DESCRIPTION OF THE DRAWINGS

The invention will now be explained in greater detail with reference to the figures (FIG. 1 to FIG. 3) and with reference to an embodiment example in the following description.

DETAILED DESCRIPTION OF THE DRAWINGS

Figure 1:
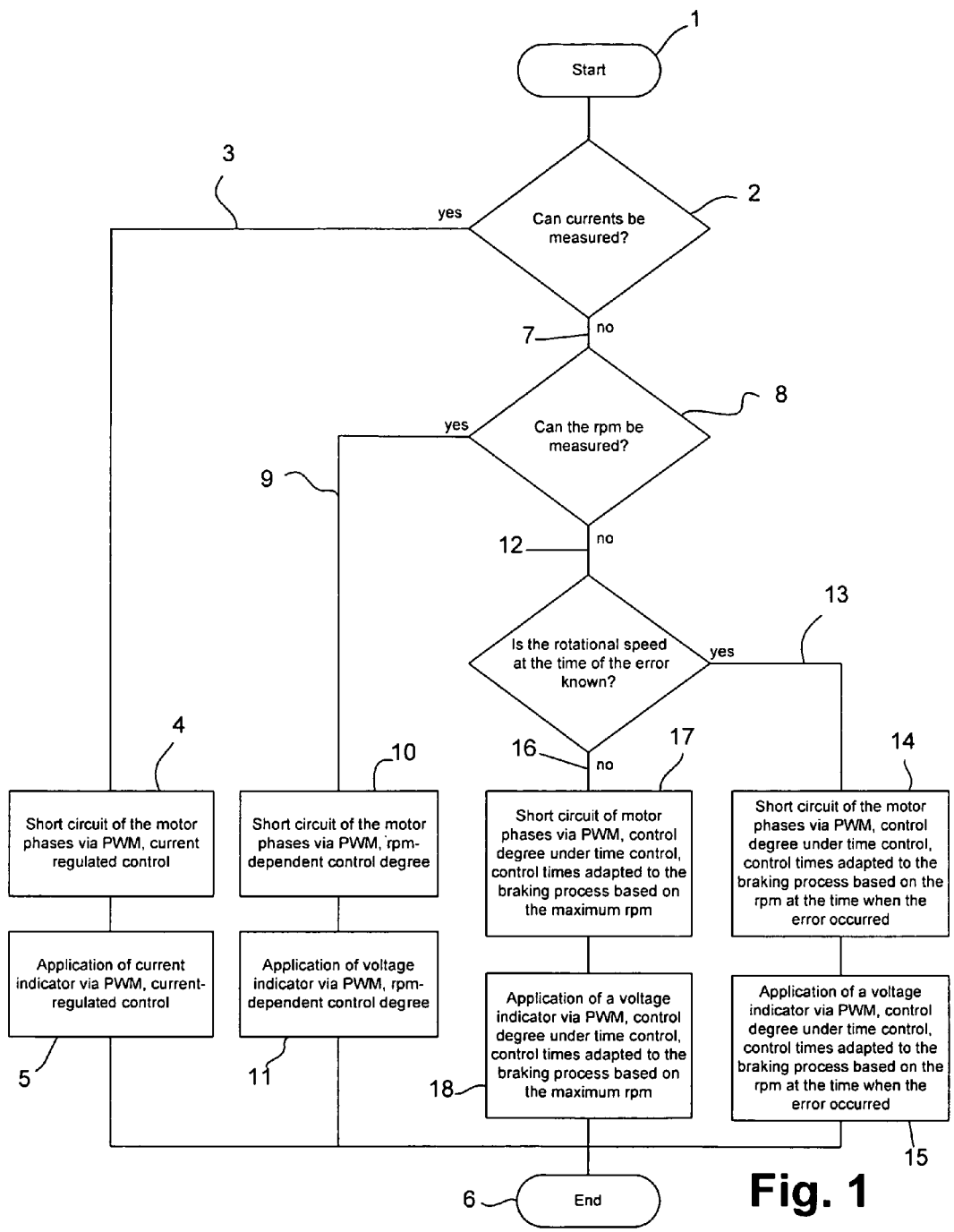
FIG. 1 shows an embodiment of an error processing overall strategy for processing an error, according to the invention, for an electronically commutated direct current motor with a PWM regulation in a schematic overview.

After the start 1 of the error processing, verification is carried out in the first step 2 to determine whether the control current or control currents can be measured.

In case the control current or control currents was (were) determined 3, the electromotor is braked, by producing a current-regulated short circuit in the motor phases via PWM 4. This process is carried out by the application of a current indicator via the PWM and the current-regulated control 5. After slowing the motor by braking until it stops, the error processing is completed 6.

If the control current or control currents is/are not determined 7, then, in an additional query step 8, a verification is carried out to determine whether a (current) rpm of the electromotor can be measured.

In case the current rpm was determined 9, the electromotor is braked, by producing, in the motor phases, a short circuit which is rpm-dependent as a function of the current rpm 10, by the application of a voltage indicator via the PWM, where the control degree is adjusted here as a function of the rpm. After braking the motor until it stops, the error processing is also completed 6.

When the current rpm of the electromotor is not determinable 12, then the electromotor is braked by producing, under time control, a short circuit in the motor phases.

For this purpose, a detection is carried out in an additional query step 13 to determine whether the rpm at the time when the error occurred is known.

If this is the case, then the electromotor is braked, by producing via the PWM 14 in the motor phases a short circuit, under time control, adapted to a braking process on the basis of the rpm at the time when the error occurred. For this purpose, a voltage indicator is applied via the PWM. The control degree is here set, under time control, on the basis of the rpm at the time when the error occurred 15. After braking the motor until it stops, the error processing is also completed 6.

Otherwise, if the rpm at the time when the error occurred is not determinable 16, the electromotor is only braked by producing, in the motor phases, a short circuit via the PWM 17, under time control, as a function of the (known) maximum rpm of the electromotor, particularly by the application of a voltage indicator via the PWM 18. After braking the motor until it stops, the error processing is also completed 6.

The method is used to brake an electromotor until it stops, where the electromotor is used, for example, as the actuator of a drive unit of an active superposition steering (ESAS) or an electromechanical brake (EMB). To avoid, during erroneous operation, the uncontrolled setting of an undesired steering angle, the drive unit of the ESAS system must be braked, when a case of error has been detected, as quickly as possible and it must be latched mechanically.

Because an error in the motor position sensing or in the electronic control and regulation unit (CPU control) can lead particularly to the incorrect setting of an undesired steering angle, it must be possible to carry out the braking function even without these components.

For this purpose, in the method according to the invention, in case of an error, the control of the electronic control unit, that is the power electronics (alternating current converter transistors or final stage transistors), which is connected to the electromotor, is taken over by an independent component, namely an electronic control and regulation unit. This component controls the electronic braking process in several steps.

Figure 2:
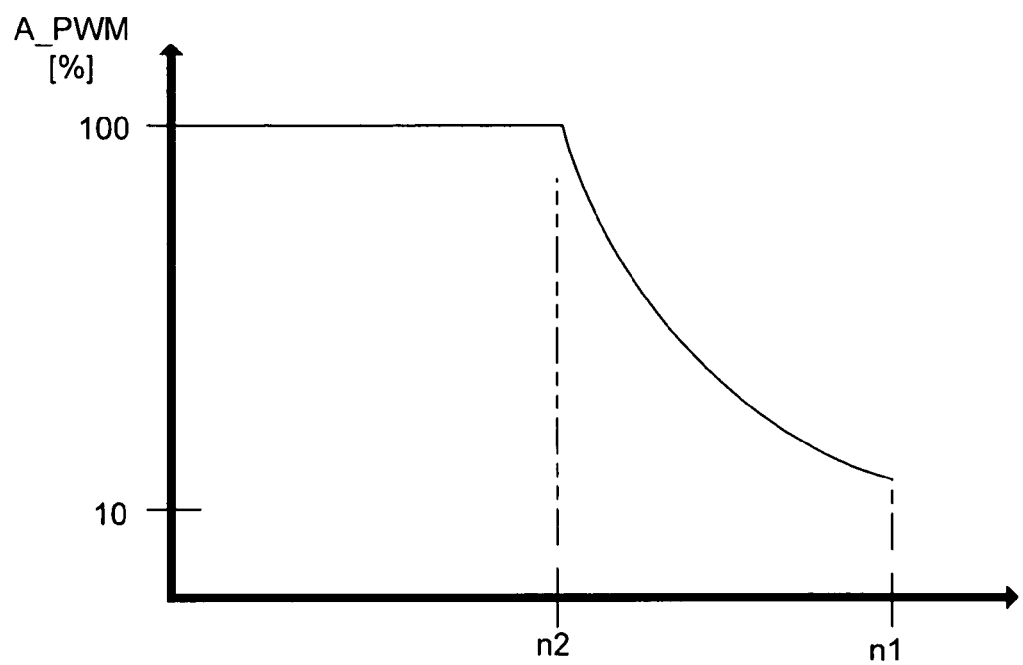
FIG. 2 shows a plot of the control degree A_PWM against the rpm n of the motor for a motor braking process.

The braking process is carried out by applying a short circuit, in an operating state, which connects the motor phases to each other using the final stage transistors. As a result of the rotation of the motor, a voltage is induced, which in turn pushes a current, resulting in a braking moment which is applied to the motor shaft. To restrict the braking current and to protect the transistors, their control is achieved by means of a pulse width modulated, adapted signal (PWM regulation) (see FIG. 2).

In the case of a decreasing rpm n, the induced voltage then also decreases, resulting in the need to increase the control degree A_PWM from a first rpm n1 and a first control degree A_PWM, in this case 10% (at the beginning of the braking process) to a maximum value A_PWM=100%, which corresponds to a second rpm n2 and where the maximum value A_PWM=100% is maintained, until the time of the stoppage (n=0).

Figure 3:
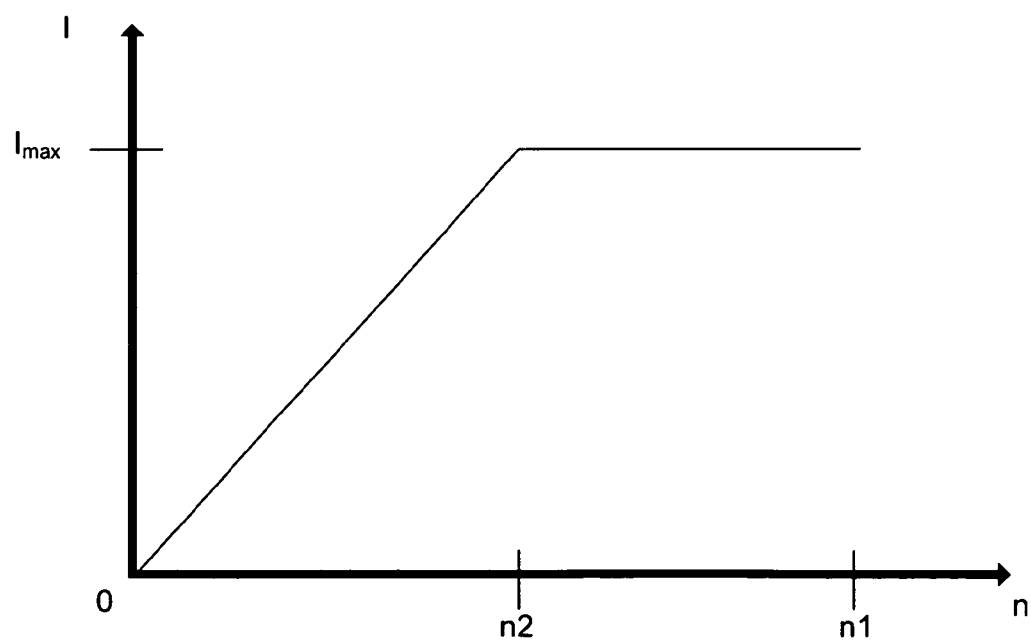
FIG. 3 shows a plot of the control current I against the rpm n of the motor for the motor braking process.

In FIG. 3, the corresponding plot of the control current is shown, which is restricted up to a lower rpm n2 to a value Imax, so that the power electronics are not overloaded.

If the current and rpm should or cannot be measured, then the control degree is selected under time control. In the process, the control which is used as the basis is the one that would be necessary in the case of braking from the maximum possible rpm in the error case. As a result, it is possible to establish simultaneously the maximum possible braking times and error angles. The control degree at the end of this operating state is 100%. In the process, the load on the different final stage transistors, particularly the given high- and low-side switches, can be distributed, by alternately switching the latter.

The method advantageously provides for the selection of the participating switches and motor phases to depend also on the evaluation of the corresponding error signals.

When a lower rpm has been reached, or after a certain time has elapsed, the brake current that is set is so low that it produces only a very minimal brake moment. In this phase of the brake process, a voltage can be applied to the windings, and drive a fixed-angle motor current. The latter then acts as a kind of "electrical notch" and can thus apply an additional brake moment. The level of the corresponding voltage is also set by pulse width modulation PWM and increased as a function of the state or of the time.

The component for controlling the brake process can consist of relatively small logics component, in the simplest case. In the case of a corresponding increase in the computing performance, additional sensor signals can then be read, models can be calculated, and error monitoring processes can be carried out automatically. However, as the last backup level, the described method is always used advantageously.

In summary, the advantageous properties of the invention are as follows:

When an error is detected, the current rotating movement of the motor is braked both mechanically, and also by electrical measures, until the motor is stopped.

The electrical braking process can be started and controlled by an independent component.

The electrical braking process occurs in at least two different operating states, where, in the first operating state, only the induced voltage is used for the application of a current, and, in the second state, an additional voltage is applied.

The change between the states and the control line of the final stage switch can occur under time control or as a function of sensor data.

In the case of the availability of current and rpm data, they can contribute to the brake control and influence the control of the final stage switches.

The choice of the final stage switches used and the type of modulation can be made to depend on the state of the final stage switches or the type of the error which occurred.

By targeted application of currents and by the measurement of different state parameters, data on the state of the system can be gained.

The monitoring unit can also have error recognition mechanisms, and it can then automatically brake and latch the drive unit once corroborated errors have been detected.

The method is advantageous for all electronically commutated motors with position sensors, independently of the applied principle of motor regulation, and thus particularly for both rotor-oriented and stator-oriented regulation.

Advantageously, errors can also be detected which result in an increase or a decrease of the torque, such as errors which call moment waviness in the driving moment. This is of great importance particularly in systems with a tactile interface with the operator, for example, an electronic servo steering system or steer-by-wire systems with a manual moment adjustor.

The invention claimed is:

1. A method braking an electromotor which can be driven by a direct current, the method comprising:
verifying a presence of one or more definite error states taking into account a maximum loading capacity of one or more electronic control units connected to the electromotor; and
carrying out a control of the electromotor to brake the electromotor based on a definite error state.

2. A method according to claim 1 further comprising:
determining whether a control current or control currents applied to the electromotor is determinable; and
if the control current was determined, the electromotor is braked, by producing, at least temporarily in at least one motor phase, a current-regulated short circuit, by application of a current indicator via a PWM on an electronically commutated direct current motor, otherwise if the control current or control currents is not detectable, the electromotor is braked, by producing, at least temporarily in at least one motor phase, a short circuit as a function of rpm or under time control.

3. A method according to claim 1 further comprising:
determining whether a current rpm of the electromotor is detectable; and
if the current rpm was detected, the electromotor is braked, by producing, at least temporarily in at least one motor phase, an rpm-dependent short circuit as a function of the current rpm by application of a voltage indicator via a PWM in an electronically commutated direct current motor, otherwise if the current rpm is not detectable, the electromotor is braked, by producing, at least temporarily in at least one motor phase, a short circuit, under time control.

4. A method according to claim 1 further comprising:
determining, at the time when the error occurred, whether an rpm of the electromotor is detectable; and
if the rpm was detected at the time when the error occurred, the electromotor is braked, by producing, at least temporarily in at least one motor phase, a short circuit, under time control, as a function of the rpm at the time when the error occurred, by application of a voltage indicator via a PWM in an electronically commutated direct current motor, otherwise if the rpm is not detectable at the time when the error occurred, the electromotor is braked, by producing, at least temporarily in at least one motor phase, a short circuit, under time control, as a function of a maximum rpm of the electromotor, particularly with the application of the voltage indicator via a PWM in an electronically commutated direct current motor.

* * * * *